US007042934B2

(12) United States Patent
Zamir (10) Patent No.: US 7,042,934 B2
(45) Date of Patent: May 9, 2006

(54) CROSSTALK MITIGATION IN A MODEM POOL ENVIRONMENT

(75) Inventor: Ram Zamir, Tel Aviv (IL)

(73) Assignee: Actelis Networks Inc., Fremont, CA (US)

( * ) Notice: Subject to any disclaimer, the term of this patent is extended or adjusted under 35 U.S.C. 154(b) by 0 days.

(21) Appl. No.: 10/052,567

(22) Filed: Jan. 23, 2002

(65) Prior Publication Data

US 2003/0137925 A1   Jul. 24, 2003

(51) Int. Cl.
*H04B 1/38* (2006.01)
*H04L 5/16* (2006.01)

(52) U.S. Cl. ............... 375/222; 375/232; 375/220; 375/285; 375/346; 375/257; 370/201; 379/3; 379/417

(58) Field of Classification Search ............. 375/219, 375/221, 222, 229–233, 278, 284, 285, 346, 375/257, 220; 379/3, 417; 370/201; 324/628
See application file for complete search history.

(56) References Cited

U.S. PATENT DOCUMENTS

| | | | | |
|---|---|---|---|---|
| 5,181,198 A | * | 1/1993 | Lechleider | 370/286 |
| 5,271,037 A | * | 12/1993 | Szechenyi | 375/259 |
| 5,887,032 A | * | 3/1999 | Cioffi | 375/257 |
| 5,970,088 A | | 10/1999 | Chen | |
| 6,160,790 A | * | 12/2000 | Bremer | 370/201 |
| 6,266,347 B1 | | 7/2001 | Amrany et al. | |
| 6,452,967 B1 | * | 9/2002 | Druilhe | 375/232 |
| 6,553,085 B1 | * | 4/2003 | Trans | 375/346 |
| 2002/0136397 A1 | | 9/2002 | Zeng et al. | |
| 2003/0086362 A1 | | 5/2003 | Hasegawa et al. | |
| 2003/0086514 A1 | | 5/2003 | Ginis et al. | |

FOREIGN PATENT DOCUMENTS

EP   1 109 328   6/2001

OTHER PUBLICATIONS

Cherubini et al , "100Base-T2: 100 Mbit/s Ethernet over Two Pairs of Category-3 Cabling". IEEE, vol. 2. Jun. 8, 1997, pp. 1014-1018.

* cited by examiner

*Primary Examiner*—Phuong Phu
(74) *Attorney, Agent, or Firm*—Pearl Cohen Zedek Latzer, LLP (57) ABSTRACT

In a modem pool system capable of mitigating alien crosstalk, a system including a first modem pool including at least two modems, at least one protected line connected to one of the modems, at least one sensor line connected to another of the modems, at least one alien crosstalk predictor operative to sample an alien signal on the at least one sensor line and provide an alien crosstalk prediction signal, and at least one alien crosstalk prediction summation element operative to receive the alien crosstalk prediction signal from the alien crosstalk predictor and subtract the alien crosstalk prediction signal from a data transmission signal on the protected line.

24 Claims, 6 Drawing Sheets

CROSSTALK MITIGATION IN A MODEM POOL ENVIRONMENT

FIELD OF THE INVENTION

The present invention relates to telecommunications systems in general, and more particularly to methods and apparatus for crosstalk cancellation in a modem pool environment.

BACKGROUND OF THE INVENTION

The ever-increasing demand for high-speed data communications services and greater bandwidth is largely due to the popularity of the Internet and other data-intensive, high bandwidth applications. Both businesses and consumers are demanding higher bandwidth connections and faster Internet access. Another source for this demand is the increasing use by businesses of data communications networks (including traffic over the Internet) for the transmission of documents and electronic mail.

Digital Subscriber Loop (DSL) technology provides one approach to addressing the demand for high-speed telecommunications service. DSL technology refers to several types of services that use advanced modem elements to transmit digital signals from a data source over copper wires. Many telephone companies have embraced DSL technology as an immediate broadband solution to serve the current demand by getting more out of their existing copper infrastructure. DSL modem elements permit high data rate transmission of data over the public switched telephone network (PSTN) at multiple megabit speeds using sophisticated signal processing techniques that permit voice and data to travel simultaneously over the same analog copper twisted pair wire.

Where DSL modems are arranged in a modem pool such that two or more modem connections are carried via the same copper wire bundle, contending with crosstalk between co-interfering modems becomes an important issue. Moreover, other wire pairs in the bundle are likely to be used by other "alien" services that have nothing to do with the modem pool. In this case, the overall noise within the bundle is likely to be composed of both self-caused crosstalk among modems of the modem pool and that of the alien services.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
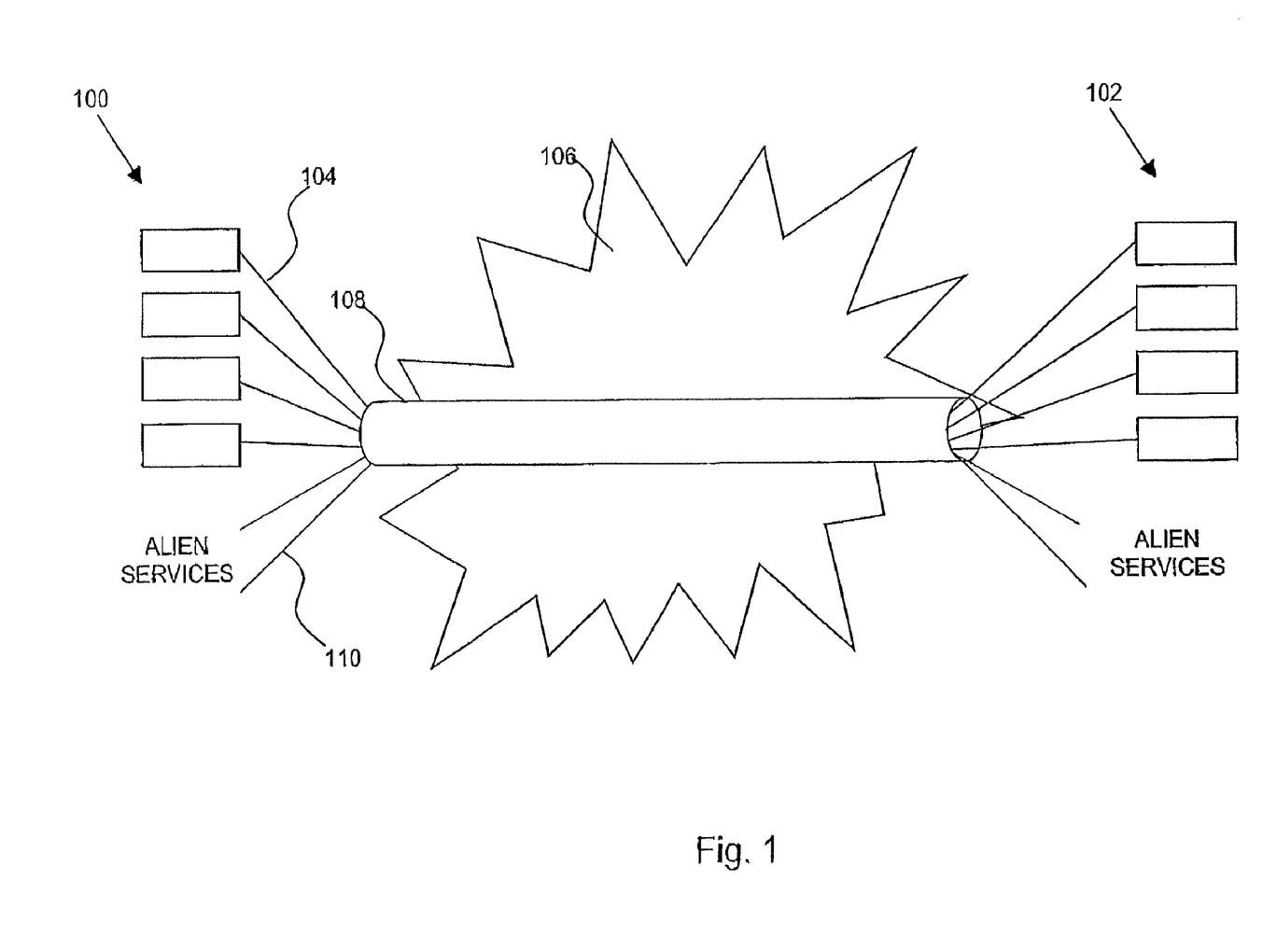
FIG. 1 is a conceptual illustration of an exemplary modem pool arrangement useful in understanding the present invention.

Reference is now made to FIG. 1, which is a conceptual illustration of an exemplary modem pool arrangement useful in understanding the present invention. A first modem pool, generally referenced 100, and comprising a plurality of individual modems is seen in communication with a second modem pool, generally referenced 102, via a plurality of connections 104 over a telephone network 106. Connections 104 are typically copper wire pairs arranged in a bundle 108. The modem pools preferably operate in a coordinated manner where a data stream is split up and transmitted via multiple modems in one of the modem pools to the other modem pool where the original data steam is reconstructed. One example of such a modem pool system is described in Applicant/assignee's U.S. patent application Ser. No. 09/510,550 filed Feb. 22, 2000, and entitled "High Speed Access System Over Copper Cable Plant," that claims priority from U.S. Provisional Application Serial No. 60/121,228, filed Feb. 23, 1999, and entitled "Access Express-Very High Data Rate Communication Channels Over Copper," both hereby incorporated by reference in their entirety. One or more alien services not part of modem pools 100 and 102 are also shown communicating via connections 110 that are also in bundle 108.

Figure 2:
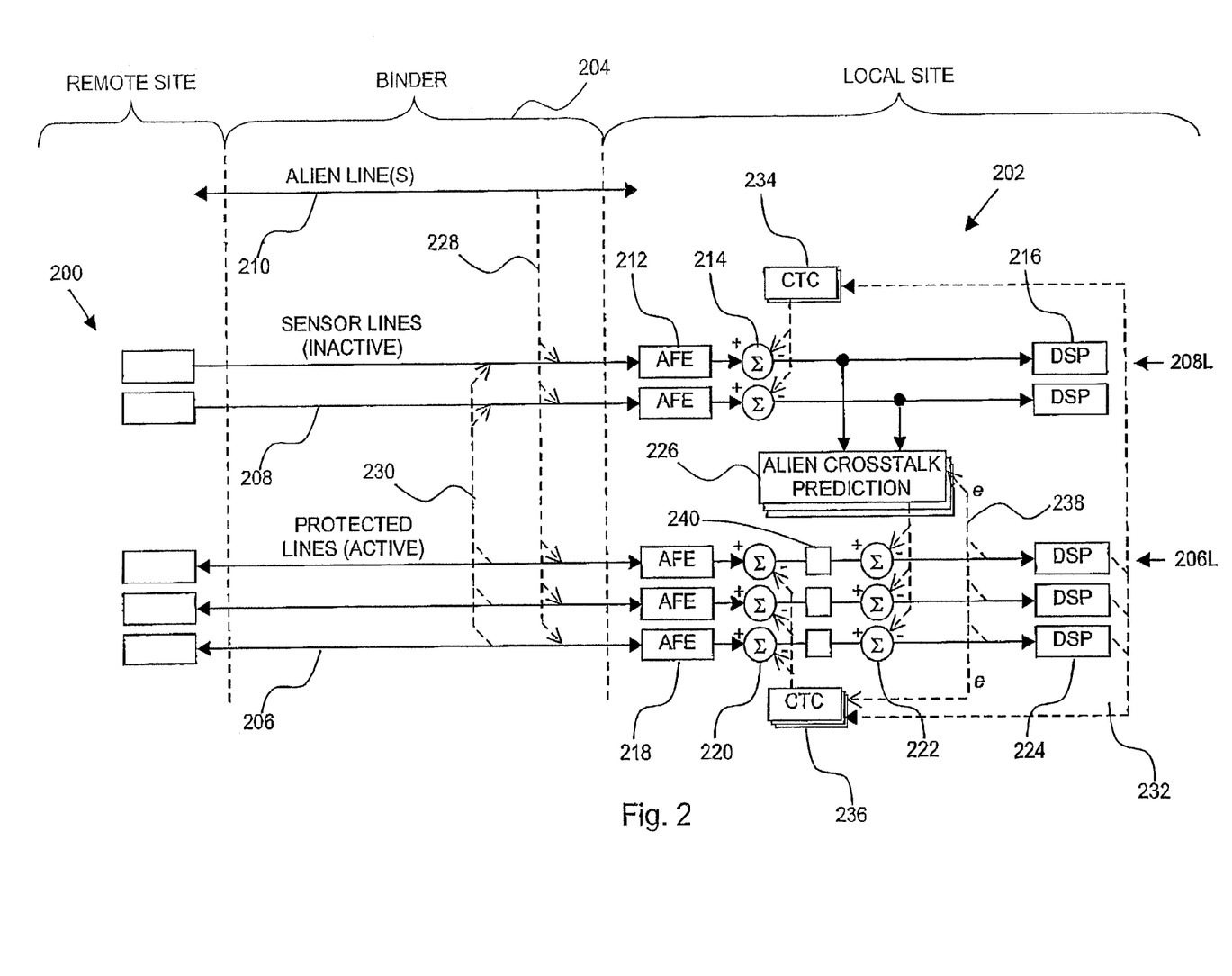
FIG. 2 is a block flow diagram of a modem pool arrangement capable of mitigating alien crosstalk, constructed and operative in accordance with a preferred embodiment of the present invention.

Reference is now made to FIG. 2 which is a block flow diagram of a modem pool arrangement capable of mitigating alien crosstalk, constructed and operative in accordance with a preferred embodiment of the present invention. In the arrangement of FIG. 2, a modem pool 200 at a remote site is shown in communication with a modem pool 202 at a local site via a binder 204 of telephone lines. One or more telephone lines 206 of binder 204 which connect modem pools 200 and 202 are lines over which modem pools 200 and 202 transmit data, and are referred to herein as "protected" lines, while one or more telephone lines 208 which connect modem pools 200 and 202 are lines over which modem pools 200 and 202 do not transmit data, and are referred to herein as "sensor" lines. Binder 204 also includes one or more telephone lines 210 which do not connect modem pools 200 and 202 and are referred to herein as "alien" lines. Preferably, the number of sensor lines 208 should exceed the number of alien lines 210.

Each modem in modem pool 202 that terminates a sensor line 208 is now referred to as modem 208L (where 'L' designates 'local') and is shown comprising an analog front end (AFE) 212 and a digital signal processor (DSP) 216. Each modem 208L may optionally include a crosstalk cancellation (CTC) filter 234 which feeds a crosstalk prediction signal for subtraction at a summation element 214. Each modem in modem pool 202 that terminates a protected line 206 is now referred to as modem 206L and is shown comprising an analog front end (AFE) 218, a variable delay unit 240, a summation element 222, and a digital signal processor (DSP) 224. Each modem 206L may optionally include a crosstalk cancellation (CTC) filter 236 and a summation element 220. One or more alien crosstalk prediction units 226 are arranged to receive samples of signals received by modems 208L, with the samples being taken at a point intermediate summation element 214 and DSP 216. Alien crosstalk prediction units 226 are also arranged to provide an alien crosstalk prediction for subtraction at summation element 222 at modem 206L. There is typically a separate alien crosstalk prediction unit 226 for each modem 206L. Preferably the sampling rates at the input and output of all the filters mentioned above (i.e., CTC 234 and 236 and alien crosstalk prediction units 226) are identical.

A typical operational scenario of the modem pool arrangement of FIG. 2 is now described. Crosstalk from transmissions over alien lines 210 is shown being received at both sensor lines 208 and protected lines 206, as is shown by a dashed line 228, while crosstalk from transmissions over protected lines 206 is shown being received at sensor lines 208, as is shown by a dashed line 230. Since no data is transmitted via sensor lines 208, signals that are received at AFEs 212 typically include primarily alien and protected line crosstalk. Alien crosstalk prediction units 226 sample the signals at modems 208L at a point intermediate AFE 212 and DSP 216. Alternatively, where CTC filters 234 and summation elements 214 are provided, protected line crosstalk may be mitigated by CTC filters 234 and summation elements 214 where a protected line crosstalk input signal is provided by DSPs 224, as is shown by a dashed line 232. CTC prediction is then performed at CTC filters 234 and the predicted crosstalk is subtracted at summation elements 214. Alien crosstalk prediction units 226 then sample the signals at modems 208L at a point intermediate summation element 214 and DSP 216. It is appreciated that any given sample may be taken once and provided to each of alien crosstalk prediction units 226. Preferably, the sampling rate is greater than the greatest transmission rate of any of modems 206L, and most preferably at twice the greatest rate.

Alien crosstalk prediction units 226 may employ conventional techniques to provide an alien crosstalk prediction of the sampled signals, such as least mean square (LMS) adaptive filtering techniques. Crosstalk cancellation techniques that may be employed by alien crosstalk prediction units 226 are also described in U.S. patent applications Ser. No. 09/643,821 entitled "Next Cancellation for Modem Pools", filed on Aug. 22, 2000, and Ser. No. 09/721,753, entitled "Dynamic Allocation of Next Cancellation" filed on Nov. 27, 2000, incorporated herein by reference in their entirety.

Signals that are received at AFEs 218 typically include primarily alien and protected line crosstalk. Where CTC filters 236 and summation elements 220 are provided, protected line crosstalk may be mitigated by CTC filters 236 and summation elements 220 where a protected line crosstalk input signal is provided by DSPs 224, as is shown by dashed line 232. CTC prediction is then performed at CTC filters 236 and the predicted crosstalk is subtracted at summation elements 220. Alien crosstalk prediction units 226 then provide an alien crosstalk prediction for subtraction at summation elements 222. Variable delay unit 240 is typically set to approximately half the length of the ACTC prediction filter 226, such that the alien crosstalk prediction is based on a time window both before and after the sample taken from the protected line signal. An error signal 238 may be provided from the signal output from summation elements 222 in order to adapt the alien crosstalk prediction using adaptive filter techniques. This error signal may also be used for adapting the CTC filters 236.

Figure 3:
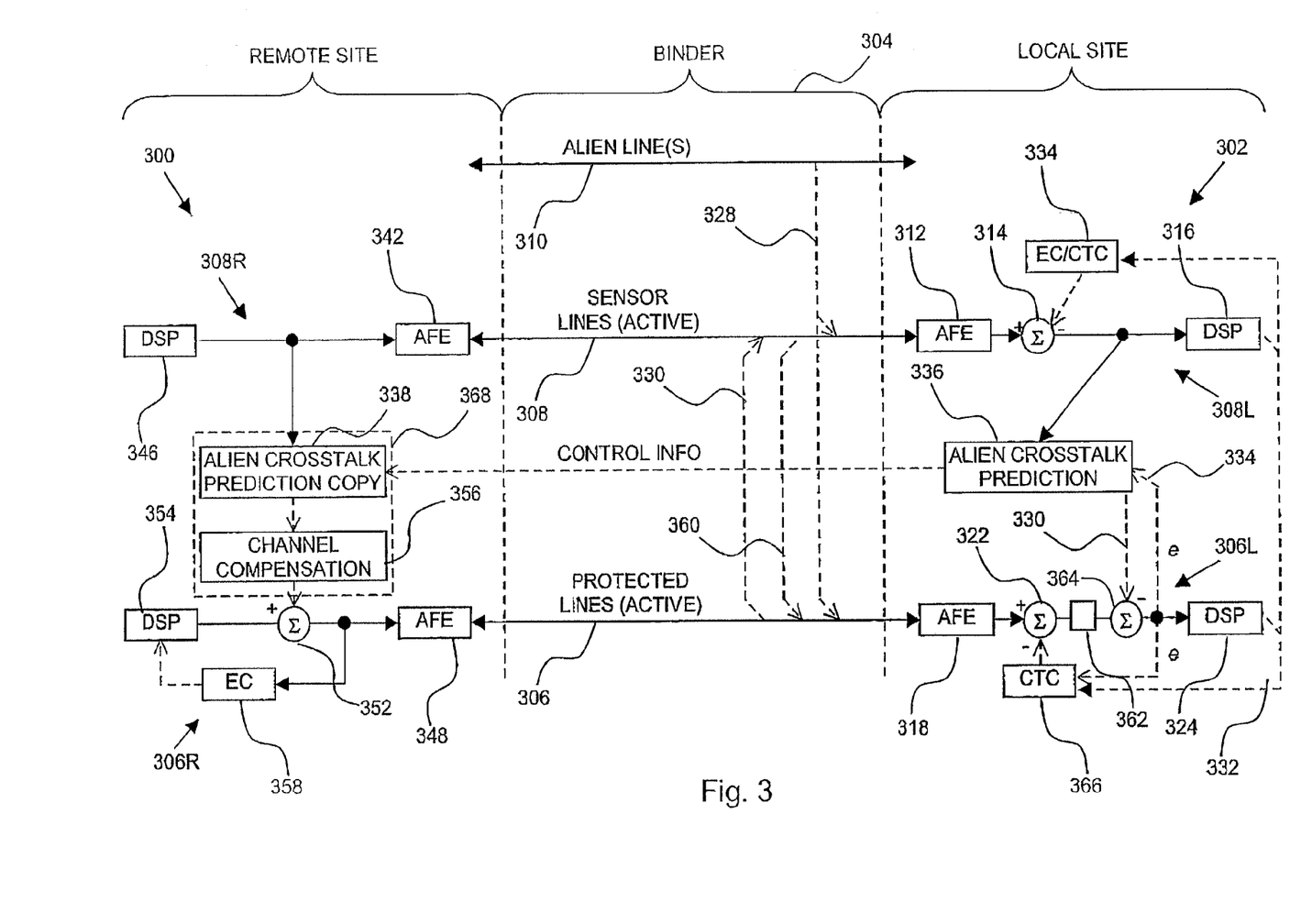
FIG. 3 is a block flow diagram of a modem pool arrangement capable of mitigating alien crosstalk, constructed and operative in accordance with a preferred embodiment of the present invention.

Reference is now made to FIG. 3 which is a block flow diagram of a modem pool arrangement capable of mitigating alien crosstalk, constructed and operative in accordance with a preferred embodiment of the present invention. In the arrangement of FIG. 3, a modem pool 300 at a remote site is shown in communication with a modem pool 302 at a local site via a binder 304 of telephone lines. One or more telephone lines 306 of binder 304 which connect modem pools 300 and 302 are lines over which modem pools 300 and 302 transmit data, and are referred to herein as "protected" lines, while one or more telephone lines 308 which connect modem pools 300 and 302 are lines over which modem pools 300 and 302 both transmit data and sense alien crosstalk, and are referred to herein as "sensor" lines. Binder 304 also includes one or more telephone lines 310 which do not connect modem pools 300 and 302 and are referred to herein as "alien" lines. Preferably, the number of sensor lines 308 should exceed the number of alien lines 310.

Each modem in modem pool 302 that terminates a sensor line 308 is now referred to as modem 308L (where 'L' designates 'local') and is shown comprising an analog front end (AFE) 312 and a digital signal processor (DSP) 316. Each modem 308L may optionally include a crosstalk cancellation (CTC)/echo cancellation (EC) filter 334 which feeds a crosstalk prediction/echo cancellation signal for subtraction at a summation element 314. Each modem in modem pool 302 that terminates a protected line 306 is now referred to as modem 306L and is shown comprising an analog front end (AFE) 318, a summation element 322, a variable delay unit 362, a summation element 364, and a digital signal processor (DSP) 324. Each modem 306L may optionally include a crosstalk cancellation (CTC) filter 366. One or more alien crosstalk prediction units 336 are arranged to receive samples of signals received by modems 308L, with the samples being taken at a point intermediate summation element 314 and DSP 316. Alien crosstalk prediction units 336 are also arranged to provide an alien crosstalk prediction for subtraction at summation element 364 at modem 306L. There is typically a separate alien crosstalk prediction unit 336 for each modem 306L.

Each modem in modem pool 300 that terminates a sensor line 308 is now referred to as modem 308R (where 'R' designates 'remote') and is shown comprising an analog front end (AFE) 342 and a digital signal processor (DSP) 346. Each modem in modem pool 302 that terminates a protected line 306 is now referred to as modem 306R and is shown comprising an analog front end (AFE) 348, a summation element 352, and a digital signal processor (DSP) 354. One or more precoders 368 (shown in dashed lines), each typically including an alien crosstalk prediction unit 338, which is a copy of alien crosstalk prediction unit 336, and a channel compensation filter 356, are arranged to receive samples of signals transmitted by modems 308R, with the samples being taken at a point intermediate DSP 346 and AFE 342. Precoder 368 is also arranged to provide a precoding signal to a precoding summation element 352 at modem 306R. There is typically a separate precoder 368 for each modem 306R.

Each modem 306R may optionally include an echo cancellation (EC) filter 358. Where an EC filter 358 is included its input signal must be taken after summation element 352 in order to cancel not only its own transmitted signal, but the signal that enters alien crosstalk prediction unit 338.

A typical operational scenario of the modem pool arrangement of FIG. 3 is now described. Crosstalk from transmissions over alien lines 310 is shown being received at both sensor lines 308 and protected lines 306, as is shown by a dashed line 328, while crosstalk from transmissions over protected lines 306 is shown being received at sensor lines 308, as is shown by a dashed line 330. Initially, no data is transmitted via sensor lines 308. Thus, signals that are received at AFEs 312 typically include primarily alien and protected line crosstalk. Protected line crosstalk may be mitigated by CTC/EC filters 334 and summation elements 314 where a protected line crosstalk prediction is provided for subtraction by DSPs 324, as is shown by a dashed line 332. Alien crosstalk prediction units 336 then sample, the signals at modems 308L at a point intermediate summation element 314 and DSP 316. It is appreciated that any given sample may be taken once and provided to each of alien crosstalk prediction units 336. Preferably, the sample rate is greater then the greatest transmission rate of any of modems 306L, and most preferably at twice the greatest rate.

Alien crosstalk prediction units 336 may employ conventional techniques to provide an alien crosstalk prediction of the sampled signals, such as least mean square (LMS) techniques. Crosstalk cancellation techniques that may be employed by alien crosstalk prediction units 336 are also described in the above-referenced U.S. patent applications Ser. Nos. 09/643,821 and 09/721,753.

Signals that are transmitted by modems 306R and are received at AFEs 318 typically include, in addition to its own data transmission signal, primarily alien and protected line crosstalk. Protected line crosstalk may be mitigated by CTC filters 366 and summation elements 322 where a protected line crosstalk input signal is provided by DSPs 324, as is shown by dashed line 332. CTC prediction is then performed at CTC filters 366 and the predicted crosstalk signal is subtracted at summation elements 322. Alien crosstalk prediction units 336 then provide an alien crosstalk prediction for subtraction at summation elements 364. Variable delay unit 362 is typically set to approximately half the length of the alien crosstalk prediction units 336, such that the alien crosstalk prediction is based on a time window both before and after the protected sample taken of the protected line signal. An error signal 334 may be provided from the signal output from summation elements 364 in order to adapt the alien crosstalk prediction using adaptive filter techniques. This error signal may be used also for adapting the CTC filters 366.

Once alien crosstalk prediction units 336 have initially "learned" the alien crosstalk from sensor lines 308, alien crosstalk prediction units 336 are initialized and cease their adaptive learning. Alien crosstalk prediction units 336 then provide alien crosstalk filter control information to corresponding pecoders 368 at the remote site in order that alien crosstalk prediction units 338 may act as duplicates of alien crosstalk prediction units 336 and provide a facsimile alien crosstalk prediction signal that is used as a precoding signal. The purpose of this duplication is to compensate for the desired signal transmitted by 308R and received by 308L penetrating through the alien crosstalk prediction units 336 and add noise to modems 306L. If the desired signal of 308R is transmitted through the same filters as the alien cancellation filters, then the result of adding the signal at the transmitter and subtracting it at the receiver will cancel out its effect. The effects of the different channels between 308R to 308L and the channels between 306R to 306L are compensated by the channel compensation filter 356 which is equal to the sensor line-to-protected line transfer function ratio.

Sensor lines 308 are then activated for data transmission with modems 308R transmitting data in the same manner as modems 306R and modems 308L transmitting data in the same manner as modems 306L. At the remote site, the signal transmitted by each modem 308R is sampled at a point intermediate DSP 346 and AFE 342. The sample is then input into precoder 368 where it is processed by alien crosstalk prediction unit 338 and channel compensation inter 356 in no particular order. The output of precoder 368 is then added at summation element 352 to a data transmission signal that is to be transmitted by each modem 306R. Where echo cancellation is performed at modem 306R, in order to ensure that the added signal does not degrade modem 306R's receiver, the input signal to EC filter 358 is taken between summation element 352 and AFE 348. EC filter 358 then samples the transmission signal of modem 306R at a point intermediate summation element 352 and AFE 348, cancels the local echo using conventional techniques, and provides a cleaned signal for receipt at DSP 354, Crosstalk from transmissions by modems 308R via sensor lines 308 is shown being received at protected lines 306, as is shown by a dashed line 360. Signals that are received at AFEs 312 typically include, from the point of view of receivers 306L, 308R signals, alien crosstalk, protected line crosstalk from modem 306L transmissions, and crosstalk from other now-active sensor lines. The 308R signals are canceled out at receivers 306L since they "traveled" in two parallel tracks, one through sensor line 308 and then through alien crosstalk prediction unit 336, and the other through precoder 368 (alien crosstalk prediction unit 338 and channel compensation filter 356) and then through protected line 306. These two tracks thus cancel each other out. Protected line crosstalk from modem 306L transmissions may be mitigated by CTC/EC filters 334 and summation elements 314 where a protected line crosstalk prediction is provided for subtraction by DSPs 324, as is shown by a dashed line 332. Alien crosstalk prediction units 336 then sample the signals at modems 308L at a point intermediate summation element 314 and DSP 316 and provide a crosstalk prediction to summation element 322 where it is subtracted from the incoming protected line signal.

In this manner crosstalk from transmissions over sensor lines 308 may be compensated for in protected line transmissions from the remote site by pre-coding. More specifically, by transmitting via sensor lines 306 in both directions, the far-end signal and the near-end echo of the sensor line enter the prediction filter input at the local site. These undesired signals interfere with the desired operation of alien crosstalk prediction filter 336, that is to predict alien crosstalk only. To compensate for local echo, echo cancellation is provided at the AFE/DSP intermediate stage of modem 308L. To compensate for the far-end signal, its effect is pre-coded at the remote site by subtracting a replica of the transmitted signal of the sensor line from the transmitted signal of the protected line.

It may be seen that when adding the signals from modem 306R and 308R at summation point 352, the amplitude of the sum is typically greater than the original signal of modem 306R. Thus, in order to avoid saturation at AFE 348, the transmission power of the signal should be reduced. However, this may result in degraded modem performance. Moreover, the required power reduction may be a function of the number of alien disturbers, thus degraded modem performance may increase in severity as the number of alien disturbers increases.

Figure 4A:
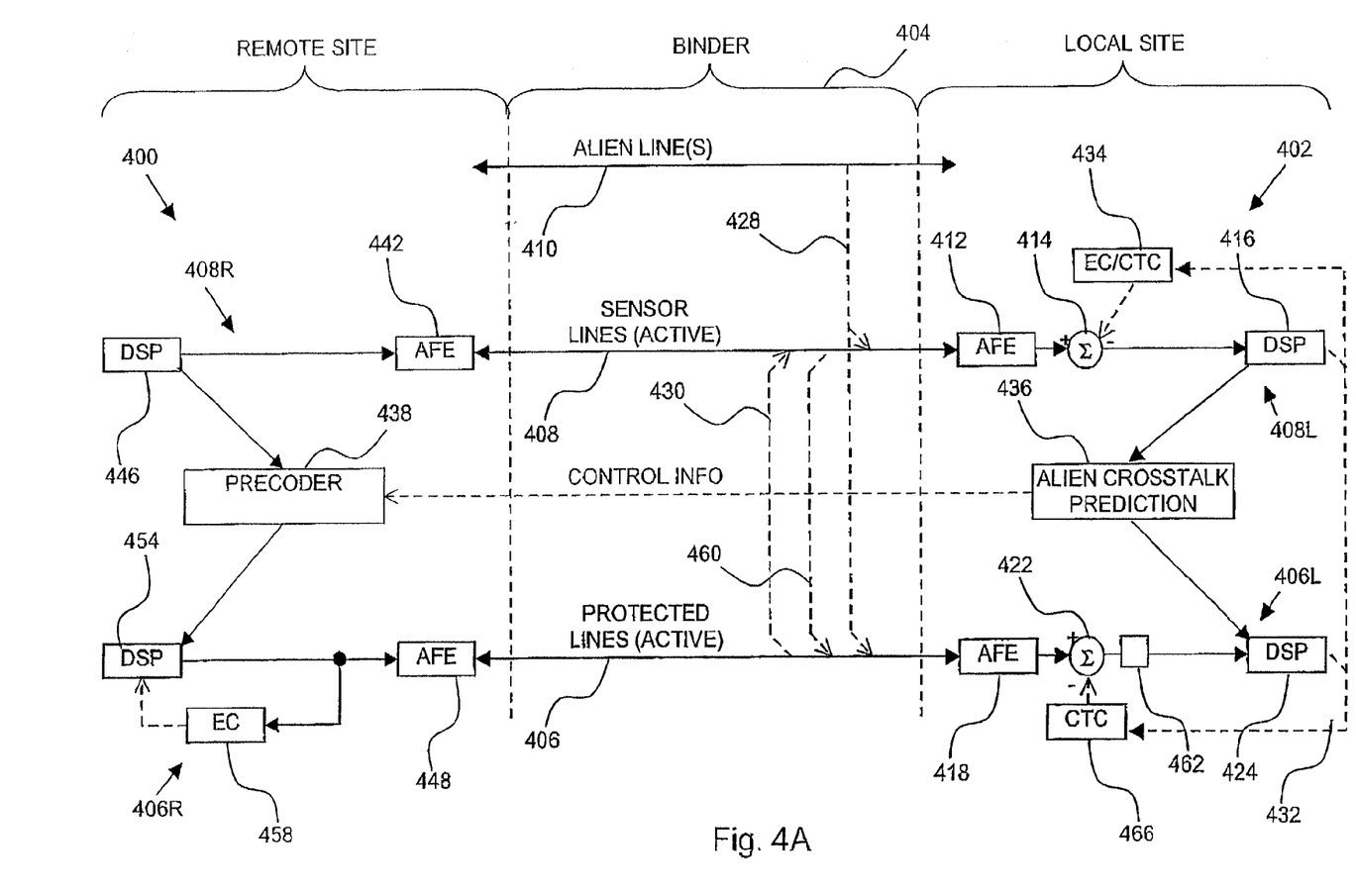
FIGS. 4A and 4B, taken together, are block flow diagrams of a modem pool arrangement capable of mitigating alien crosstalk, constructed and operative in accordance with a preferred embodiment of the present invention.
Figure 4B:
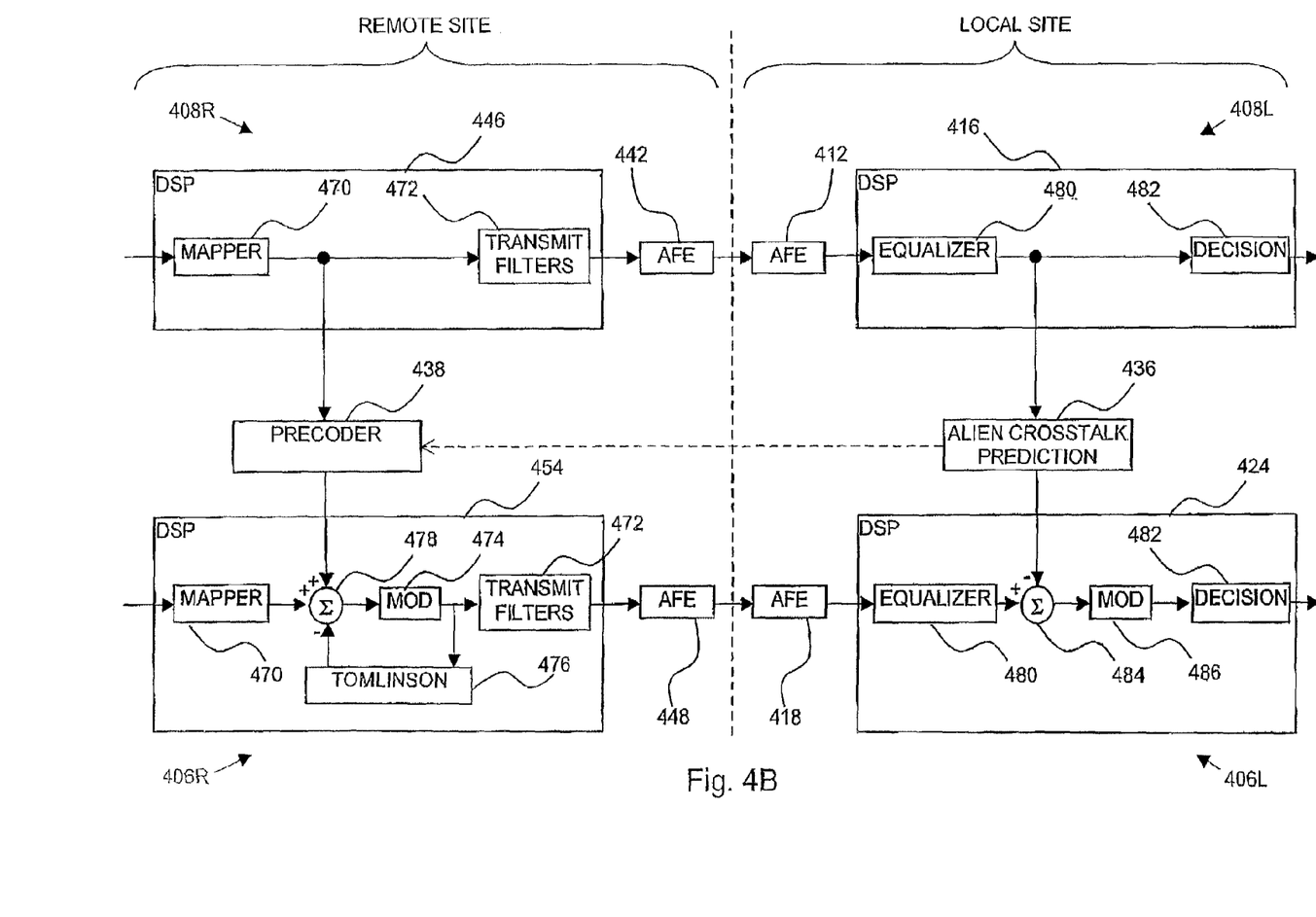

Reference is now made to FIGS. 4A and 4B, which, taken together, are block flow diagrams of a modem pool arrangement capable of mitigating alien crosstalk, constructed and operative in accordance with a preferred embodiment of the present invention. The arrangement of FIGS. 4A and 4B is similar to the arrangement of FIG. 3 except as is now noted. In the arrangement of FIGS. 4A and 4B the input signals to alien crosstalk prediction unit 436 and precoder 438 are taken directly from DSP 416 and 446 respectively, and the output signals provided by alien crosstalk prediction unit 436 and precoder 438 are provided directly to DSP 424 and 454 respectively. Precoder 438 includes a copy of alien crosstalk prediction unit 436 and no channel compensation filter. As is shown in greater detail with particular reference to FIG. 4B, DSP 446 and 454 at the remote site each typically include a mapper unit 470 and a transmit signal processing unit 472. It is appreciated that DSP 446 and 454 may include other well-known DSP circuitry not shown, such as an encoder unit in conjunction with mapper unit 470. Data bits received by mapper unit 470 are translated into constellation points, such as, for example, in PAM4 modulation where every two bits are mapped to a one-dimensional constellation point which is one of the numbers −3, −1, 1, or 3. The input signal to precoder 438 is taken from the output of mapper unit 470 at DSP 446.

DSP 454 also includes a precoding summation element 478 which sums output from DSP 454's mapper unit and output from precoder 438. The output of summation element 478 is then provided to a modulo unit 474 which limits the output signals to the constellation region irrespective of how many signals are added together and what their amplitudes are, in order to avoid any power cutback. Thus, in the PAM4 modulation example described above, the sum is taken modulo 8 and shifted by an integer multiple of 8 to the interval [−4 4]. DSP 454 may also include a filter 476 in order to pre-cancel Inter Symbol Interference (ISI), such as a Tomlinson Harashima filter. The output of filter 476 is then preferably subtracted from the precoded signal at summation element 478. The output of modulo unit 474 is then provided to transmit signal processing unit 472 of DSP 454 for further processing and transmission.

At the local site, both the receiver DSPs 416 and 424 typically include an equalizing unit 480 and a decision unit 482. It is appreciated that DSPs 416 and 424 may include other well-known DSP circuitry not shown, such as a DFE unit in conjunction with decision unit 482. The input signal to alien crosstalk prediction unit 436 is taken from the output of equalizing unit 480 of DSP 416. DSP 424 also includes a summation element 484 which sums output from DSP 424's equalizing unit 480 and output from alien crosstalk prediction unit 436. The output of summation element 484 is then provided to a modulo unit 486 whose output is provided to DSP 424's decision unit 482. It is noted that modulo unit 486 is typically the same as modulo unit 474.

It is appreciated that signal sampling and signal subtraction/cancellation as described hereinabove with reference to FIGS. 3, 4A, and 4B may occur at points other than those which are described, provided that they occur at complementary points within the transmitting and receiving modem pools.

It is appreciated that an active sensor line may also be protected by a subset of the other sensor lines in the system. Also, it is appreciated that a system comprising active sensor lines may also include passive sensor lines.

Figure 5:
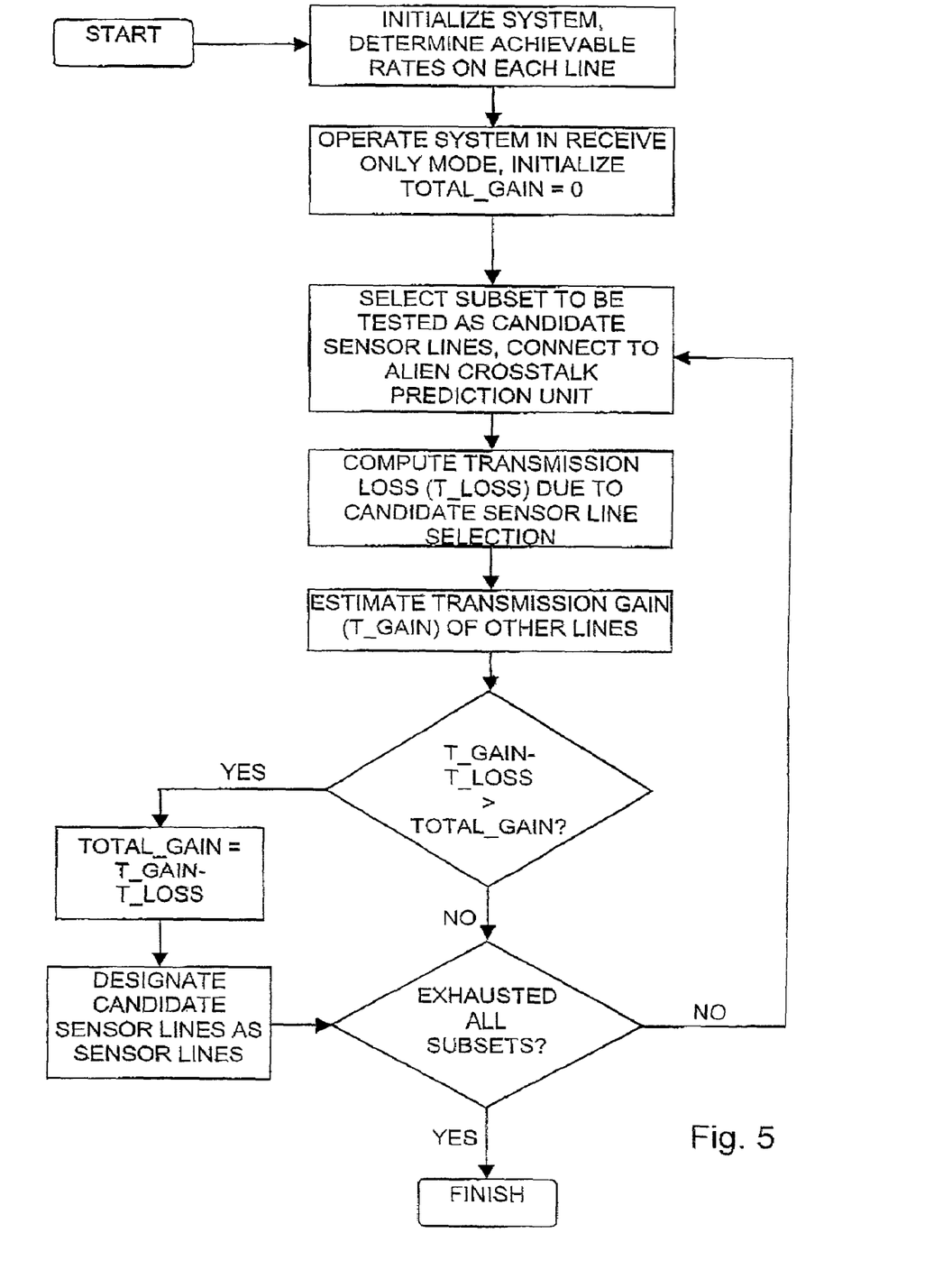
FIG. 5 is a flowchart illustration of a method of selecting sensor lines, operative in accordance with a preferred embodiment of the present invention.

Reference is now made to FIG. 5, which is a flowchart illustration of a method of selecting sensor lines, operative in accordance with a preferred embodiment of the present invention. In the method of FIG. 5 a line is selected to be either a sensor line or a protected line by considering the loss of transmission capacity of a line being designated a sensor line versus the improvement in overall modem pool transmission capacity as a result of the line being designated a sensor line. The number of sensor lines and the selection of sensor lines according to the present invention is typically part of the wake up of the system. Preferably, during wake up the system is initialized and an achievable transmission rate is determined for each line using any conventional means. All system transmissions are then ceased and the system is operated in receive-only mode where data are not transmitted via protected lines or sensor lines. A variable, referred to herein as Total_Gain, may be used to track transmission capacity gain and may be initialized to 0. Different subsets of the various lines are then chosen as candidate sensor lines, either at random or in accordance with a predetermined selection sequence. For each subset of candidate sensor lines the system operates in receive-only mode and operates alien crosstalk prediction units in conjunction with the candidate sensor lines as described hereinabove. A variable, referred to herein as T_Loss, may be used to track transmission capacity loss as a result of using the candidate lines as sensor lines. For example, if the sensor lines are passive, then T_loss is equal to the sensor lines' achievable transmission capacity, whereas if the sensor lines are active then typically T_loss=0. Conventional means may then be employed to estimate the noise reduction on each of the other lines of the system, currently considered as candidate protected lines. For example, noise reduction filters employing LMS techniques may be used to perform noise reduction. Alternatively, the crosstalk matrix of the lines may be computed and an off-line calculation may be performed to compute the theoretical noise reduction. The noise reduction may be translated to a transmission gain, such as may be measured in Bits Per Second (BPS), on each of the protected lines, and may be stored in a variable, referred to herein as T_Gain. The total transmission capacity gain to the system given the subset of lines chosen as sensor lines is the difference between the transmission capacity gain of the protected lines and the transmission capacity of the subset if they were not chosen to be sensor lines, expressed as T_Gain-T_Loss. It may then be determined, using conventional techniques, which subset of lines results in maximal total transmission capacity gain, and thus enables the system to achieve maximal throughput. This subset may then be designated as sensor lines, with the remaining lines designated as protected lines.

While the present invention has been described with reference to equal sampling rates for all modems, it is appreciated that the present invention may be adapted for use in systems where sampling rates vary.

It is appreciated that one or more of the steps of any of the methods described herein may be omitted or carried out in a different order than that shown, without departing from the true spirit and scope of the invention.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A modem pool system capable of mitigating alien crosstalk, the system comprising:
   a first modem pool comprising at least three modems;
   at least one protected line connected to one of said modems;
   a plurality of sensor lines connected to at least another two of said modems;
   at least one alien crosstalk predictor operative to sample an alien signal on said plurality of sensor lines and provide an alien crosstalk prediction signal; and
   at least one alien crosstalk prediction summation element operative to receive said alien crosstalk prediction signal from said alien crosstalk predictor and subtract said alien crosstalk prediction signal from a data transmission signal on said protected line, wherein said predictor is operative to provide said alien crosstalk prediction signal to a different one of said summation elements at each of said modems connected to said protected lines.

2. A system according to claim 1 wherein said modem pool is configured to transmit data via said protected line.

3. A system according to claim 1 wherein said modem pool is configured to refrain from transmitting data via said sensor line.

4. A system according to claim 1 wherein each of said at least one protected line and said plurality of sensor lines are assembled within a binder including at least one alien line not connected to said modem pool.

5. A system according to claim 1 wherein any of said modems in said modem pool comprises:
   a crosstalk cancellation (CTC) filter operative to receive a signal from any of said modems and provide a crosstalk cancellation signal; and
   a crosstalk cancellation summation element operative to receive said crosstalk cancellation signal from said CTC and subtract said crosstalk cancellation signal from any of said lines.

6. A system according to claim 5 wherein any of said modems in said modem pool comprises:
   an analog front end (AFE); and
   a digital signal processor (DSP) in communication with said AFE.

7. A system according to claim 6 wherein said alien crosstalk prediction summation element is intermediate said AFE and said DSP at a terminus of said protected line.

8. A system according to claim 6 wherein said crosstalk cancellation summation element is operative to subtract said crosstalk cancellation signal at a point intermediate said AFE and said DSP.

9. A system according to claim 6 wherein said alien crosstalk predictor is operative to sample an alien signal on said sensor line at a point intermediate said AFE and said DSP.

10. A system according to claim 9 wherein said crosstalk cancellation summation element is operative to subtract said crosstalk cancellation signal at a point intermediate said AFE and said alien crosstalk predictor sample point.

11. A system according to claim 6 wherein said crosstalk cancellation summation element is operative to subtract said crosstalk cancellation signal at a point intermediate said AFE and said alien crosstalk prediction summation element.

12. A system according to claim 6 and further comprising a variable delay unit intermediate said crosstalk cancellation summation element and said alien crosstalk prediction summation element.

13. A system according to claim 6 wherein the sampling rates at the input and output of said CTC and said alien crosstalk predictor are identical.

14. A system according to claim 1 and further comprising a second modem pool comprising at least one modem, wherein said protected line and said plurality of sensor lines connect said modem pools.

15. A system according to claim 1 wherein said alien crosstalk predictor is an adaptive LMS filter.

16. A system according to claim 6 wherein said CTC filter is an adaptive LMS filter.

17. A method for mitigating alien crosstalk in a modem pool environment, the method comprising:
   sampling a plurality of alien signals on a plurality of sensor lines connected to a respective plurality of modems in a modem pool;
   filtering said plurality of sampled signals, thereby providing an alien crosstalk prediction signal based on said plurality of sampled signals;
   subtracting said alien crosstalk prediction signal from a data transmission signal received on at least one protected line connected to at least one other modem in said modem pool.

18. A method according to claim 17 and further comprising transmitting data via said protected line.

19. A method according to claim 17 and further comprising refraining from transmitting data via said sensor line.

20. A method according to claim 17 and further comprising:
   sampling at least one signal at at least one of said modems;
   deriving a crosstalk cancellation signal for said signal; and
   subtracting said crosstalk cancellation signal from any of said lines.

21. A method according to claim 17 wherein said subtracting step comprises subtracting intermediate an AFE and a DSP of any of said modems at a terminus of said protected line.

22. A method according to claim 20 wherein said subtracting said crosstalk cancellation signal comprises subtracting said crosstalk cancellation signal at a point intermediate an AFE and a DSP of any of said modems.

23. A method according to claim 17 wherein said sampling step comprises sampling said alien signal at a point intermediate an AFE and a DSP of any of said modems at a terminus of said sensor line.

24. A method according to claim 20 wherein said sampling steps comprise sampling at identical rates.

* * * * *